Patented Nov. 5, 1929

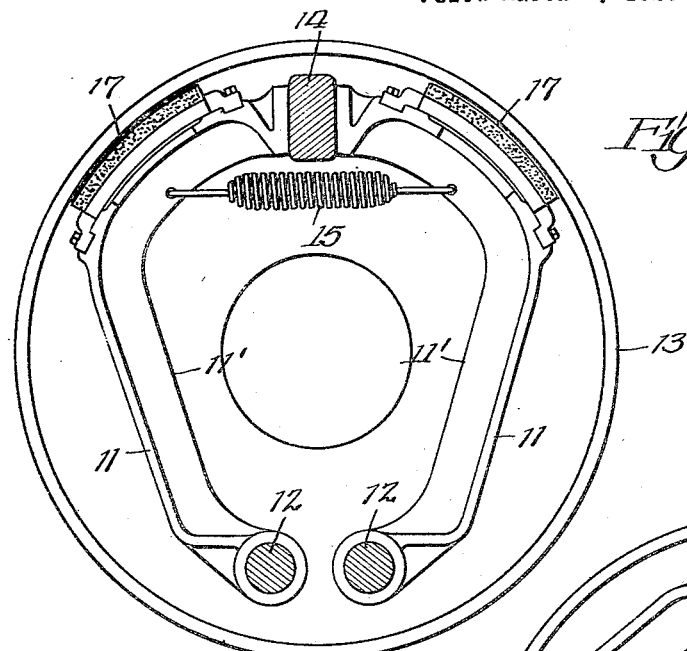
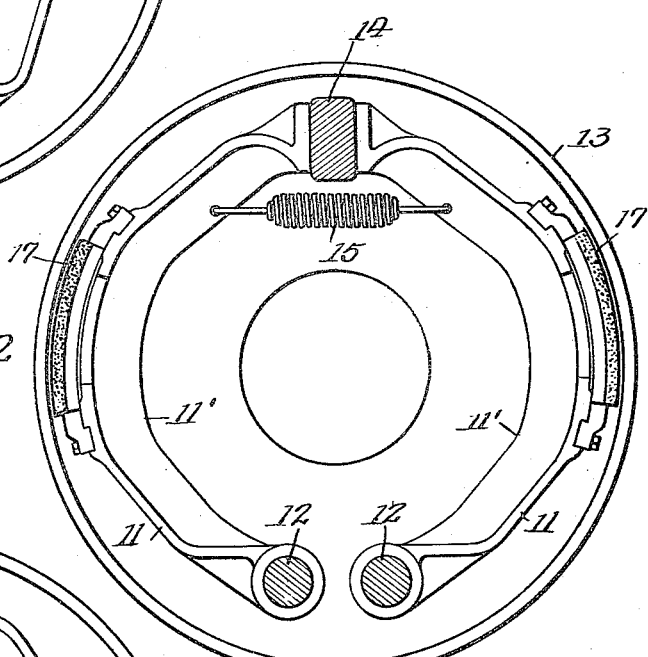
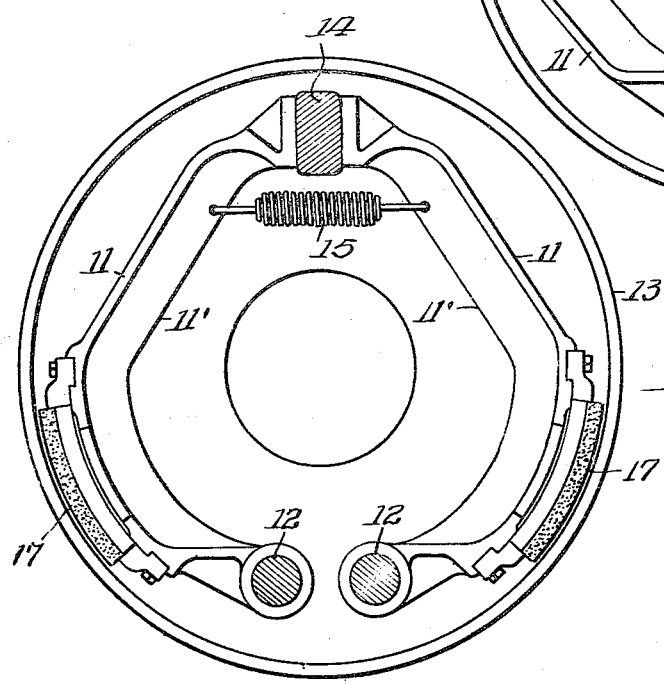

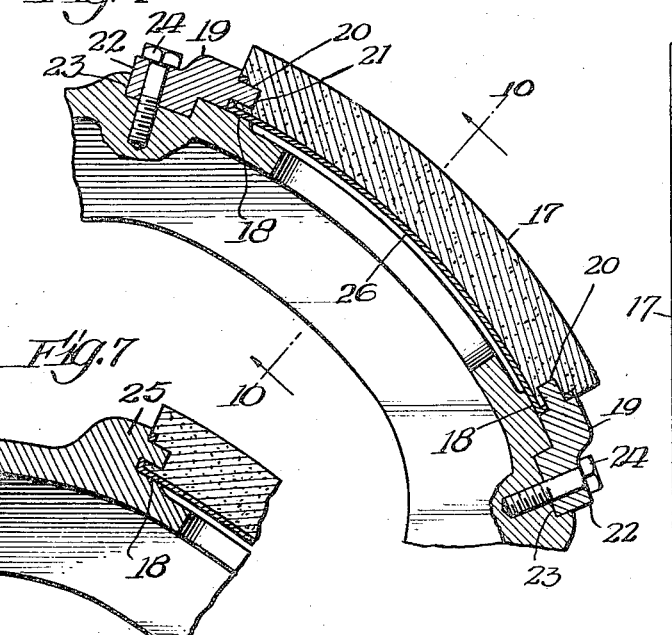
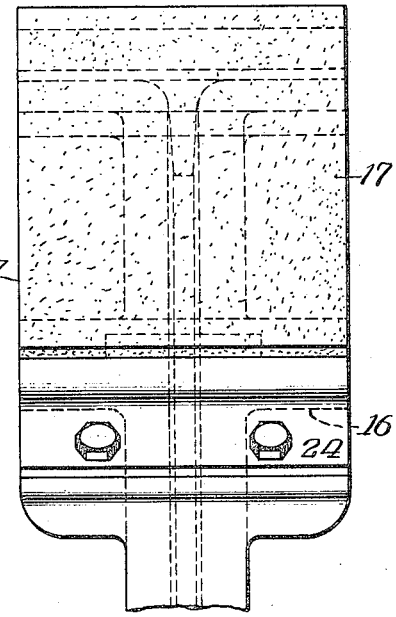
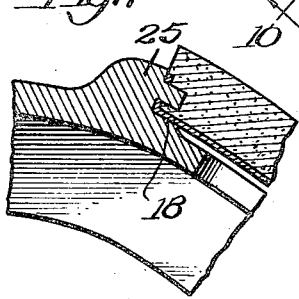
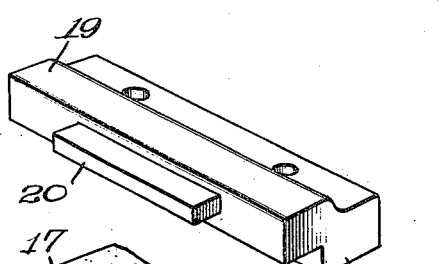
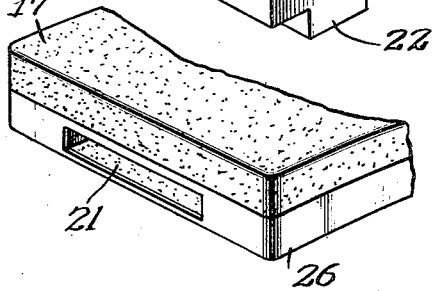
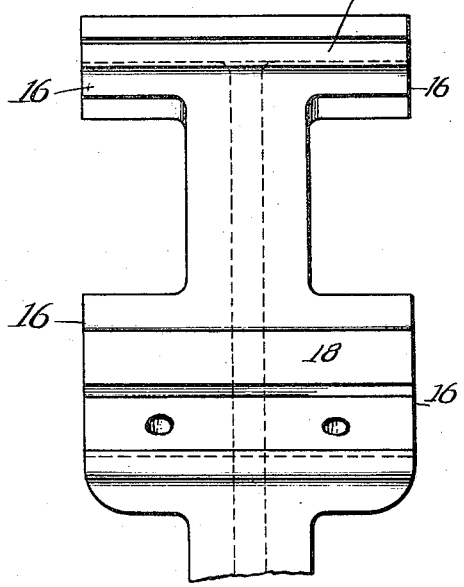
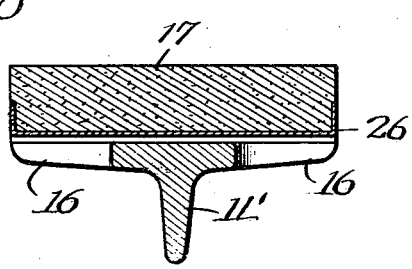

1,734,753

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed March 3, 1926. Serial No. 92,048.

This invention relates to friction brakes and while it is particularly adapted for expanding brakes arranged to make frictional contact with a drum, which is a form of brake commonly employed in automotive vehicles, it is also useful in many other installations as will be apparent to those skilled in the art.

The object of the invention is to provide a novel brake head of simple construction, light in weight and skeleton in form, with means for detachably securing a friction shoe thereto.

A further object is to construct the head to form an efficient support for the shoe and provide ventilation about the head and shoe for quickly dissipating the heat of friction.

And a further object is to provide means of simple character whereby the shoe may be secured in place upon the head without removing the head from the vehicle.

For the purposes of this application I have illustrated the invention in a simple form in an expanding brake for automotive vehicles and referring thereto:

Figs. 1, 2 and 3 are elevations, partly in section, showing a brake assembly in part, with different dispositions of the shoes therein.

Fig. 4 is an enlarged longitudinal sectional view through the shoe ad a portion of the head.

Fig. 5 is a plan view of Fig. 4.

Fig. 6 is a plan view of that part of the head forming a seat for the shoe.

Fig. 7 is a detail sectional view showing means integral with the head for securing one end of the shoe thereto.

Fig. 8 is a perspective view of a detachable clamp.

Fig. 9 is a perspective view of one end of a shoe showing the recess to receive the securing means; and Fig. 10 is a transverse section on line 10—10 of Fig. 4.

In my tests and commercial practice of the invention I have used a skeleton head with a single shoe mounted thereon. The shoe may be disposed adjacent the free end of the head, (Fig. 1); at or about the middle of the head (Fig. 2); or adjacent the pivoted end of the head (Fig. 3). The ordinary expanding brake assembly for automotive vehicles of heavier type, here selected to illustrate an embodiment of the invention, comprises a pair of brake heads 11, 11 pivoted at one end on studs 12, 12 within the rim of the drum 13. Means are provided including a cam 14 for swinging the heads on their pivots to carry the shoes into frictional contact with the drum, and a spring 15 retracts the heads.

In the embodiment of the invention illustrated, each head comprises a T-shaped arm 11' having pairs of lateral projections 16 thereon to form an arcuate seat for and to support the shoe 17. The shoe preferably rests at its ends on transverse shoulders 18, 18 extending across the projections and elevated above that part of the arm between the pairs of projections, so that the back of the shoe is entirely free from the head except at narrow portions at the ends of the shoe which engage the shoulders (Fig. 4), whereby the shoe is freely ventilated at the back. A shoe thus supported will resist any crushing force or blow it may receive in application of a brake in service.

Means are provided for detachably securing the shoe to the head which, in the form illustrated, comprise lugs 19 having projections 20 to engage recesses 21 in the ends of the shoe. The body 22 of each detachable lug is shaped to fit snugly in a transverse slot 23 in the head, the side walls of said slot being substantially radial to the arc of the seat. Engagement of the lugs with the ends of the shoe prevents endwise displacement of the shoe on the head. The lugs are secured to the heads by bolts 24. Engagement of the lug projections with the recesses in the shoe prevents lateral displacement of the shoe on the head.

I may make one of the lugs an integral part of the head as shown at 25 in Fig. 7, since the shoe may be readily engaged therewith before the other lug is placed in position.

I may use a shoe of any kind suitable for the purpose, but I prefer to use a composition shoe with or without a metal back 26, as may be found desirable to satisfy different conditions. The shoe is preferably made reversible end for end on the seat provided by the shoulders, for simplicity and convenience in installing and replacing shoes.

The invention provides an efficient brake of simple construction, which will give satisfactory service on light vehicles and on heavy vehicles, and on vehicles carrying light loads or heavy loads. The skeleton head may be made light in weight as compared with heads now used, and a brake shoe can be used having much less area of contact than the brake linings now employed. The invention also enables a shoe to be quickly installed or replaced at any time and at any place, in a shop or on the road, without requiring special tools or skill.

The skeleton construction of a brake assembly embodying the invention provides ventilation for the brake and permits the friction heat developed in braking to dissipate quickly, keeping the brake drum comparatively cool. This is of great importance particularly with metal or disk wheels which are largely used on heavy vehicles, since it prevents the friction heat from traveling to the wheel rims, where it tends to vulcanize the tires at the beads. This is the cause of much damage to tires, and is prevented by my invention because of the light skeleton construction and restricted friction contact area, which provides space around the head and shoe for circulation of air to ventilate the brake, not only to prevent excessive heating, but to quickly carry off heat that may be produced.

My invention can be embodied in various forms in brake assemblies of many kinds for different installations, but I consider it sufficient for this application to show the simple form illustrated. I do not intend thereby to limit or restrict myself to this particular disclosure, but reserve the right to make all modifications and adaptations of the invention that may be covered by the following claims.

I claim:

1. In a friction brake, a brake head comprising an arm, and lateral projections at the sides of the arm providing a skeleton seat to receive a friction shoe.

2. In a friction brake, a brake head comprising an arm and two pairs of lateral projections on the arm, said pairs being spaced apart to form a seat for a friction shoe.

3. In a friction brake, a brake head comprising an arm, and shoulders on the arm extending transversely thereof and spaced apart longitudinally of the arm to support a friction shoe.

4. In a friction brake, a brake head comprising an arm, two pairs of lateral projections thereon spaced apart lengthwise of the arm, and shoulders on said projections to support a friction shoe.

5. The combination of a brake head, a composition friction shoe seated thereon and having recesses in its ends, lugs engaging the head and said recesses in the shoe to secure the shoe on the head and means engaging said lugs and head for detachably clamping and securing the shoe on the head.

6. The combination of a brake head, a friction shoe seated thereon and having recesses in its ends, lugs secured on the head at the ends of the shoe, and projections on the lugs engaging said recesses in the shoe to secure the shoe on the head and prevent endwise and sidewise displacement of the shoe.

7. The combination of a brake head having recessed seats therein, a composition friction shoe on the head, and means seated in said recesses and engaging the end walls of the shoe for securing the shoe on the head.

8. The combintion of a brake head having recessed seats therein, a composition friction shoe on the head, and lugs seated in said recesses and having projections engaging the walls of the shoe to secure the shoe on the head.

9. The combination of a brake head having shoulders thereon, a friction shoe on the head having recesses in its ends, lugs seated against said shoulders, projections on the lugs engaging the recesses in the shoe, and bolts securing said lugs to the head.

10. The combination of a brake head having a shoe seat thereon, a composition friction shoe engaging said seat and having recesses in its end walls, and removable fastening means secured to the head and comprising oppositely projecting parts engaging said recesses for holding the shoe on said seat.

11. The combination of a brake head having a shoe seat thereon, a composition friction shoe engaging said seat and having enclosed recesses in its end walls, and removable fastening means secured to the head beyond the ends of said seat and comprising oppositely projecting parts engaging said recesses for holding the shoe on said seat.

12. The combination of a brake head having an arcuate shoe seat, a composition shoe engaging said seat, there being transverse slots in the head at the ends of said seat, the side walls of said slots being substantially radial to the arc of the seat, and fastening devices engaging said slots and the ends of the shoe for securing the shoe on the head.

JAMES S. THOMPSON.